United States Patent [19]
Senda et al.

[11] 3,967,250
[45] June 29, 1976

[54] CONTROL SYSTEM OF AN ELECTRONIC EXCHANGE

[75] Inventors: Yasuhiro Senda, Machida; Sumitoshi Ando, Tokyo, both of Japan

[73] Assignee: Kokusai Denshin Denwa Kabushiki Kaisha, Tokyo, Japan

[22] Filed: Feb. 6, 1975

[21] Appl. No.: 547,580

Related U.S. Application Data

[63] Continuation-in-part of Ser. No. 368,830, May 16, 1973, abandoned.

[30] Foreign Application Priority Data

May 22, 1972  Japan............................ 47-50523

[52] U.S. Cl.......................... 340/172.5; 179/18 ES; 179/18 J
[51] Int. Cl.²...................... G06F 3/00; H04M 3/00
[58] Field of Search............. 340/172.5; 179/18 ES, 179/18 J

[56] References Cited
UNITED STATES PATENTS

| | | | |
|---|---|---|---|
| 3,524,946 | 8/1970 | Pinet et al........................ | 179/18 J |
| 3,558,827 | 1/1971 | Lucas et al........................ | 179/18 J |
| 3,598,914 | 8/1971 | Synnott............................ | 179/18 J |
| 3,649,759 | 3/1972 | Buzzard et al.................. | 179/18 J X |
| 3,760,364 | 9/1973 | Yamauchi et al.............. | 340/172.5 |
| 3,828,321 | 8/1974 | Wilber et al..................... | 340/172.5 |

Primary Examiner—Raulfe B. Zache
Attorney, Agent, or Firm—Paul & Paul

[57] ABSTRACT

A new and improved stored program controlled electronic exchange system for a common channel signaling system through separate data links has been found. The control facility of said electronic exchange is shared by a common signal controller and a stored program type computer. The controller processes signals in said data links relating mainly to the transmission of signals such as serial-parallel conversion error control etc., while the computer processes signals relating to the copy of the transmitted signals. A common clock generator is provided for all data links for driving a plurality of MODEM's in said common signal controller and sending a signal in each data link in the same phase.

Further, a pair of common signal controllers may be provided on a dual mode operation basis to increase the operational reliability.

3 Claims, 6 Drawing Figures

CONTROL SYSTEM OF AN ELECTRONIC EXCHANGE

COPENDING APPLICATIONS

The present application is a continuation-in-part application of U.S. Ser. No. 368,830, filed May 16, 1973, which is now abandoned.

BACKGROUND OF THE PRESENT INVENTION

The present invention relates to a control system of an electronic exchange, more particularly relates to a terminal equipment for controlling common channel signals and a system of the same in a telephone exchange utilizing said common channel signals, wherein a plurality of said common signalling channels are time divisionally controlled, receiving signals are sent from the terminal equipment to a central processing unit and sending signals are sent from the central processing unit via the terminal equipment to the common signalling channels.

In order to serve the increased quantitative and qualitative demands in the field of communications of present day society, common control type electronic exchanges utilizing electronic devices are being developed in recent years in place of the conventional mechanical control type exchange. The electronic exchange carries out not only high speed switching of a plurality of telephone channels but also provides new services such as abbreviated dialing, call waiting and subscriber dialing for international calling. Further, it provides exchange functions in a total (or integrated, overall) communication network including image or picture communications, data communications and composite picture and data communications, so that the prospect for its future is very promising.

Various methods for the electronic exchange have been proposed. In the present invention, mechanical switches such as crossbar switches are mainly used on the speech channels, and the exchange device is controlled by a stored program control system in accordance with a time division (or sharing) multi-system. Further, in the present invention, a common channel signalling system, for example, No. 6 signalling system recommended by CCITT (Comite Conseltatif International Telegraphique et Telephonique; International Telegraph and Telephone Consultative Committee) is adopted.

First, a common channel signalling system will be briefly explained. This system uses a high speed data transmission technique wherein supervisory telephone signals (on-hook and off-hook of a telephone) and dial pulse signals are transmitted through a single specific channel at a very high speed. In this common channel signalling system, signals of plural speech circuits are simultaneously transmitted through a single common signalling channel which is greatly different from the conventional signalling system wherein telephone signals are transmitted through speech circuits. For example, data of 2,400 bits/sec are transmitted through a common signalling channel using a four-phase differential phase modulation. In this transmitting system one signal unit consists of 20 data bits and 8 check bits for detecting errors by a cyclic code. That is, one signal unit is composed of 28 bits, and one block is composed of 11 signal units. An acknowledgement signal unit (Acu) is inserted every 12 signal units. Different from the telephone signals, this acknowledgement signal unit (Acu) is a special signal unit which has acknowledgement indicators indicating whether the received 11 signal units are right or wrong, a block number sent from the own station and a block number received from the distant station. When the distant station is informed by this acknowledgement indicator that a wrong signal was received, said signal unit is retransmitted. Further, when there is no telephone signal to be sent, a synchronization signal unit (Syu) is sent as a blank signal. Even when the synchronization signal unit (Syu) is received wrong, it is not retransmitted.

The sending and receiving processes of the above-mentioned common channel signals are shared by both the common signal controller and the central processing unit.

In the electronic switching system and the signalling terminal according to the conventional technique, when a plurality of common signalling channels are controlled, the signal process and channel control operations are all entrusted to the central processing unit. Consequently, the load of the central processing unit, that is, the amount of processing thereof excessively increases. Further, in the prior art, a terminal having the same function is provided for each of the common signalling channels, and when there are many common signalling channels the hardware circuit elements become tedious, bulky and expensive.

There have been known many electronic exchanges including U.S. Pat. Nos. 3,524,946, 3,558,827, 3,598,914, 3,649,759 and 3,760,364. However, U.S. Pat. No. 3,524,946 to Pinet et al relates to a time division PCM Telephone Exchange, and in particular relates to a register connected to a central computer in an electronic exchange, and has no concern with a common signal control system in which signals in a plurality of channels are commonly transmitted through an separate data link. Therefore, said patent is alleged to relate to a completely different type of exchange from that of the present invention. U.S. Pat. No. 3,558,827 to Lucas et al proposes a new signalling system between a master station and a slave station. In contrast, the present invention as claimed relates to the particular common signal controller for the particular common channel signalling system (such as the No. 6 system recommended by CCITT). Therefore, present invention is believed patentably distinct from Lucas. U.S. Pat. No. 3,598,914 to Synnott does disclose a common signal controller. Synnott's signalling terminal does not operate on a time division basis, as does the one claimed. U.S. Pat. No. 3,649,759 to Buzzard et al relates to a time divisional MODEM for data transmission, but is not concerned at all with common signal controller. Finally, U.S. Pat. No. 3,760,364 to Yamauchi et al shows only a signalling terminal of the class set forth in the prior art FIG. 1 representation of the instant application.

SUMMARY OF THE INVENTION

Therefore, the principal object of the present invention is to overcome the above-mentioned conventional drawbacks.

Namely the present invention provides an electronic switching system wherein a plurality of channels are commonly controlled utilizing time division technique, so as to eliminate the redundant signalling terminals, and simple signal processing such as processing of the acknowledgement signal unit (ACU) and retransmission for an errorneous signal which was carried out at redetermined period of time can be carried out by the single common signal controller so as to decrease the load of the central processing unit.

A further object of the present invention is to provide a common signal controller for controlling common channel signals and a modulation-demodulation device for realizing the electronic switching system.

BRIEF EXPLANATION OF THE DRAWINGS

Further features and advantages of the present invention will be apparent from the ensuing description with reference to the accompanying drawings to which, however, the scope of the invention is in no way limited.

DESCRIPTION OF THE PREFERRED EMBODIMENTS

At first an electronic switching system and a common signal controller for controlling common channel signals according to the prior art will hereinafter be illustrated with reference to FIG. 1.

Figure 1:
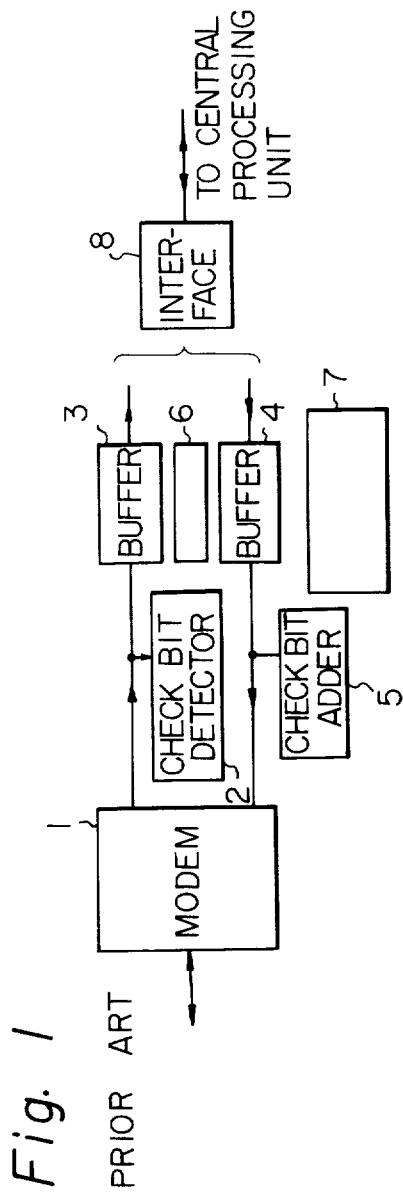
FIG. 1 is a block diagram showing a principle of a signalling terminal for controlling common channel signals according to the prior art.

FIG. 1 is a block diagram showing a part of the above-mentioned conventional signalling terminal.

In FIG. 1, a modulator-demodulator 1 includes an oscillator for generating sending timing signals; a detector 2 for detecting check bits of the received signal and after judging whether the received signal is right or wrong, the result information is sent to a central processing unit (not shown) via an interface circuit 8. A receiving signal buffer memory 3 has a capacity of storing one signal unit comprising 20 bits, and after receiving one signal unit, 20 bits are transmitted in parallel to the central processing unit via the interface circuit 8. When a synchronization command is sent from the central processing unit to the receiving signal buffer memory 3, said memory 3 can search for a synchronization pattern. A sending signal buffer memory 4 stores the above-mentioned parallel 20 bits delivered from the central processing unit. A check bit coding circuit 5 calculates the serial bits one by one sent from the sending signal buffer memory 4 and after 20 bits are all sent, successively sends the remaining 8 bits of a cyclic code calculation as check bits. A circuit 6 receives a timing from a MODEM 1 and carries out bit count and unit count so as to correctly sample a signal unit. A circuit 7 receives a sending timing from the modulator-demodulator 1 and controls the bits sent from the sending buffer memory 4 and provides necessary signal timing.

In the conventional art a set of hardware for one common signalling channel consists of all the circuit elements mentioned above. Therefore, except for the interface circuit 8 arranged between the signalling terminal and the central processing unit, in the case where n-channels are used, n-sets of the hardwares are naturally necessary. The interface circuit 8 can be commonly used for n-sets. This interface 8 has already been realized in the known data channel devices.

As described above, in the signalling terminal according to the prior art, telephone signals are derived from the data of the signalling channel, and after checked whether the derived telephone signals are right or wrong, they are simply transferred to the central processing unit. On the other hand, after the signalling terminal successively receives the signals sent from the central processing unit, check bits are added and then the signals are simply sent to the signalling channel. Consequently, the processing of the sending and receiving signals are all charged to the central processing unit. Accordingly, in the case of a stored program type electronic exchange, the amount of jobs of the central processing unit increases. Further, in the case where many channels are installed, most of the working times of the central processing unit are occupied in the jobs of common channel signals and the time allowable for the essential exchange processing such as a connection control of calls becomes small and in the worst case the processing ability is lowered.

Finally, both in structure and in function, the signalling terminal of FIG. 1 is similar to items 108 in FIG. 1 of said U.S. Pat. No. 3,598,914 to Synnott.

However, the signalling terminal of FIG. 1 has the disadvantages as mentioned before.

Figure 2:
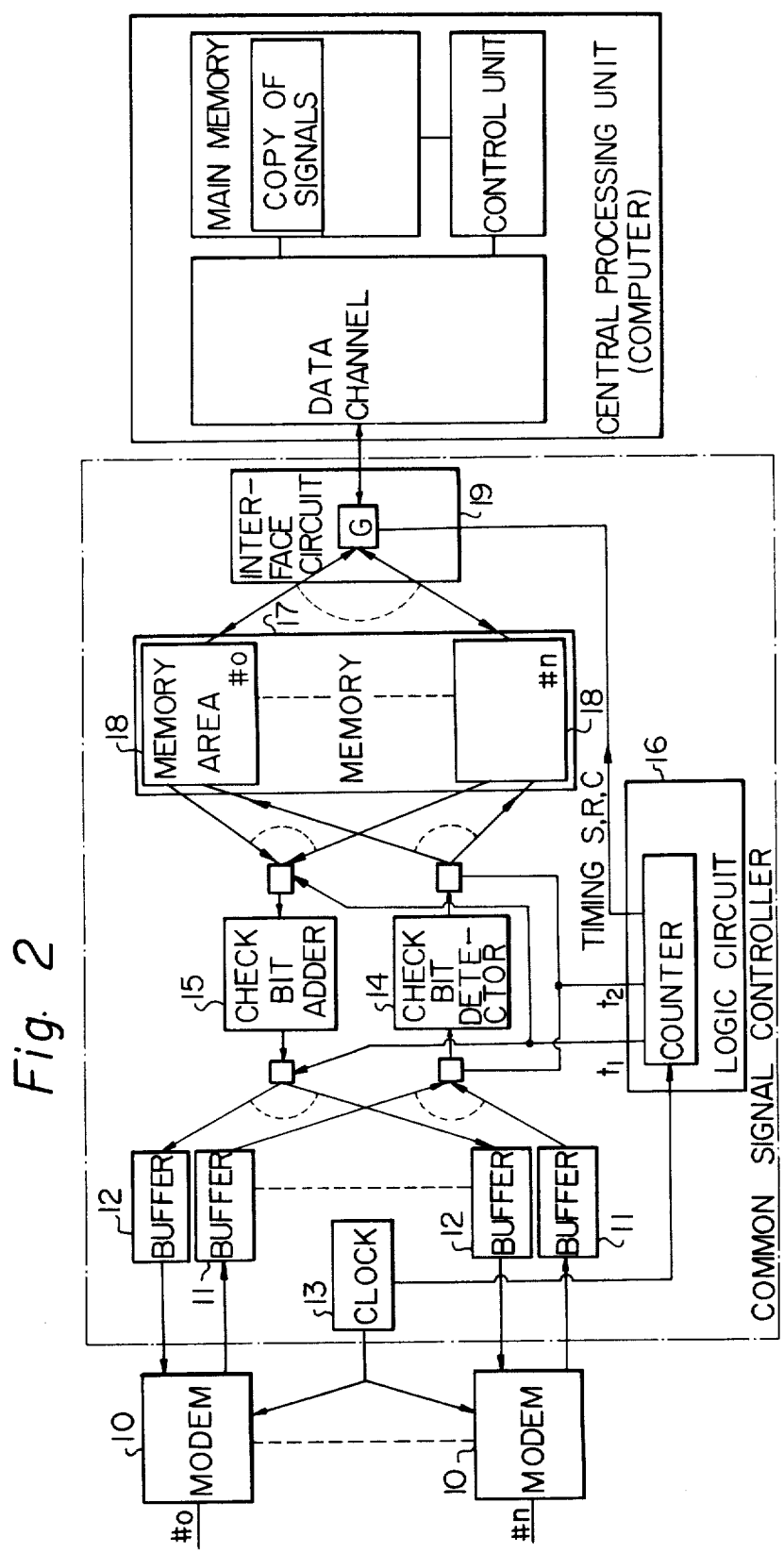
FIG. 2 is a block diagram of an embodiment of a common signal controller according to the present invention.
Figure 3:
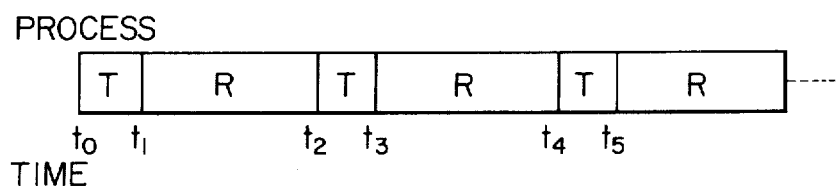
FIG. 3 is a control time sequence chart according to the present invention.
Figure 4:
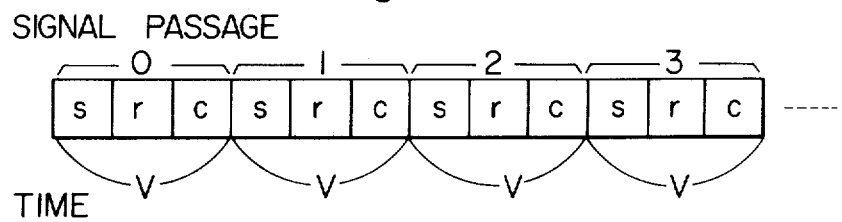
FIG. 4 is a time sequence format showing each interface cycle time between a terminal equipment and a central processing unit.

FIG. 2 is a block diagram of an embodiment of a common signal controller according to the present invention, FIG. 3 is a control time chart, and FIG. 4 is a time sequence format for sending or receiving signal information through an interface circuit.

In FIG. 2, 10 is a plurality of modulator-demodulator sets each of which includes no clock oscillator and has the same construction as that of the prior arts; 11 is a plurality of receiving signal buffer memories each of which has a memory capacity of 28 bits for one signal unit; 12 is a plurality of sending signal buffer memories each of which has the same memory capacity as that of the receiving signal buffer memory 11; 13 is a common clock for supplying a sending timing signal; 14 is a common check bit detection circuit; 15 is a common check bit addition circuit; 16 is a logic circuit for counting a sending timing and controlling the present terminal equipment; 17 is a temporary memory; 18 is a plurality of memory areas corresponding to the signalling channels, respectively, and; 19 is a common interface circuit which connects the common signal controller with a central processing unit.

The central processing unit is embodied by a program controlled general purpose computer and functions to control the operation of the whole exchange system, in particular relating to the common signal controller, functions to store sending and receiving signals, and to re-transmit the sending signals.

Figure 6:
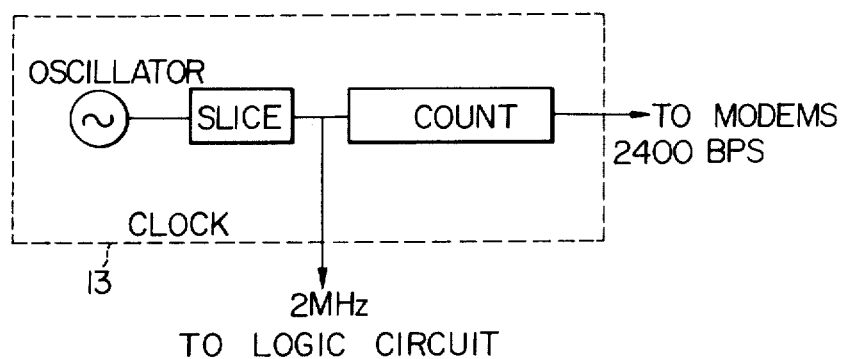
FIG. 6 is a block diagram of a clock circuit for supplying common timing signal to a logic circuit and a plurality of MODEM's.

The common clock 13 is shown in detail in FIG. 6, in which an oscillator generates a high frequency sine wave signal. The sine wave signal is changed to a pulse signal through a slicer. The output of the slicer (the frequency of which is, for instance, 2 MHz) is applied to the logic circuit 16 and a counter. The counter divides the input signal (2 MHz) and provides the low frequency pulse signal (2400 BPs) to MODEMO's 10.

Next, operations of the circuit shown in FIG. 2, regarding sending signal processing (T), receiving signal processing (R) and interface (19) will be illustrated with reference to FIGS. 3 and 4.

1. SENDING SIGNAL PROCESSING (T)

One signal unit (20 bits) is tranferred from the central processing unit to each channel memory area 18, located in the temporary memory 17, through the interface circuit 19 within a time $t$ (approximately 11.7 ms in No. 6 signalling system) and stored therein. The sending signal unit is transferred from the central processing unit to the memory areas 18 during a time $s$ ($S<V=t/n$) in $V$ allotted to each channel as shown in FIG. 4. When a clock of the logic circuit 16 comes at the sending signal processing time to the logic circuit 16 carries out a sending signal processing for all the channels ($n$) within a period of time of $t_1 - t_0$ as shown in FIG. 3. That is, when the content of the signal unit (20 bits) stored in each memory area 18 is not the acknowledgement signal unit (Acu), the above-mentioned signal unit is read out and passed through the common check bit addition circuit 15 so as to add 8 check bits in one action, and the obtained 28 bits of one signal unit are stored in each channel area in the sending signal buffer memory 11. The sending signal processing (T in FIG. 3) finishes by carrying out the above-mentioned operation n times within a period of time $t_1 - t_0$. The information of the parallel 28 bits set into the sending signal buffer memory 12 is sent to the modulator-demodulator 10 at the rate of 2400 bauds according to a timing from the external common clock 13. Thus, the modulated signal is sent to the common signalling channel through the modulator-demodulator 10. In the present system, the timing of the sending signal from the modulator-demodulator 10 of each channel is defined by the external common clock 13. Data of each channel of 2,400 bauds, for example, are all sent out with the same timing. However, according to the conventional system, the timing of sending signal is defined by each independent oscillator and therefore the timing of the sending signal on each channel does not coincide. Consequently, the modulator-demodulator 10 according to the present invention has no internal clock for determining the timing of the sending signal, said timing being supplied by a timing signal from the external common clock 13.

The features of the circuit of the present invention shown in FIG. 2 are that the receiving and the sending signal buffer memories 11 and 12 are respectively provided to each channel and that the modulation-demodulation device 10 provided to each channel is driven by the external common clock 13.

2. RECEIVING SIGNAL PROCESSING (R)

In the modulation-demodulation device 10, the receiving signal timing is derived from the received signal data by the conventional known method, and the received signal data are regenerated from every received bit and then the received signal data are stored in the receiving signal buffer memory 11. When the receiving signal buffer memory 11 receives 28 bits, a receiving signal processing demand is sent to the logic circuit 16. In FIG. 3, as soon as the sending signal processing T is finished, the logic circuit 16 begins a receiving signal processing R. The logic circuit 16 carries out the following processes in sequence for the signalling channels requesting the receiving signal processing. At first, the parallel 28 bits received at the receiving signal buffer memory 11 are read out and the error is checked by the common check bit detection circuit 14, and then the check result is written in the editorial portion of the acknowledgement signal unit (Acu) of the memory area 18 for said signalling channel. Next, the content of the 20 bits of one signal unit with the 8 check bits removed are written in the receiving signal memory portion of the same area 18. In the same manner as above, the receiving signal processing R for all the receiving buffer memories 11 requesting a receiving signal processing are carried out.

In carrying out the receiving signal processing R, the logic circuit 16 counts up the count in the memory area 18 every time the logic circuit 16 receives one signal unit, and checks if one block is completed, that is to say, checks if the content of the counter (memory area 18) reaches 11 when, for example, 1 block is composed of 12 units. When the content of the counter of the memory area 18 is 11, the receiving signal at that time is supposed to be the acknowledgement signal unit (Acu). When the acknowledgement signal unit (Acu) is correctly received, the receiving signal block number is written in the editorial portion of the acknowledgement signal unit (Acu) in the memory area 18. Also, the content of 20 bits is written in the receiving signal memory portion.

In the interface cycle shown in FIG. 4, when a receiving signal transmission period $r$ begins, 20 bits contained in the acknowledgement signal unit (Acu) memory portion in the memory area 18 are transmitted to the central processing unit via the interface circuit 19. Further, in the receiving signal processing, whether the received signal is in synchronous condition or not is detected by the number of continuous errors of receiving signal units, and if the out of synchronous condition is detected, a synchronization pattern (Syu) detecting command is immediately sent to the receiving buffer memory 11. The receiving buffer memory 11 has a synchronization pattern detecting gate for detecting whether the received signal of 28 bits is a synchronization pattern or not. When the synchronization pattern detecting command is sent out, in the receiving signal buffer memory 11, the received 28 bits are shifted one bit at a time in the same way as a shift register every time one bit is received so as to discriminate whether the received signal of 28 bits is a synchronization pattern or not. When a synchronization pattern is detected, the logic circuit 16 is informed and the receiving signal processing is requested thereto.

3. SENDING SIGNAL PROCESSING (T)

The sending signal processing T again begins at a time $t_2$ (FIG. 3). Each cycle time $t_2 - t_0 = t_4 - t_2$ is defined less than a time $t$ (approximately 11.7 ms) required for sending one signal unit as mentioned previously. Next, the case in which the acknowlegement signal unit (Acu) is to be sent during the sending signal processing period is explained. The unit counter contained in the memory area 18 counts up every time the sending signal processing of one unit is carried out. When the content of the counter of the memory area 18 is 11 during the period of sending signal processing the sending signal processing of the acknowledgement signal unit (Acu) begins. The acknowledgement signal unit (Acu) is at first assembled by receiving signal check bits written in the acknowledgement editorial portion, and the receiving signal block number and the ending signal block number obtained from the acnowledgement signal of the distant exchange, and hen the assembled signal unit is set into the sending ignal buffer 11. When the acknowledgement signal nit (Acu) is sent, the sending signal block number is dded to one. If there is no signal to be sent out from he memory area 18 at the starting time $t_2$ of the sending signal processing, a synchronization signal unit Syu) is edited and sent out therefrom.

4. INTERFACE (19)

As shown in FIG. 4, each interface cycle time "$V$" for ach signalling channel is divided into three portions of ending period s, receiving period r and copying period . As stated previously, this interface cycle time $V$ is lefined by No. 6 signalling system as $n \times V < 11.7$ ms. During the sending signal period s, the sending signal is et in the memory area 18. If there if no sending signal, his fact (for example, all zero information) is stored in nemory area. During the receiving signal period r, the eceiving signal stored in the memory area 18 is tranerred to the central processing unit (Cpu). In this case, iowever, if the receiving signal is a synchronization ignal unit (Syu), no signal is transferred. During the copying signal period c, the central processing unit Cpu) is informed of the type and sequence of each ignal sent to each signalling channel, and when the listant station requests retransmission of the signal, aid signal is searched and then it is retransmitted.

Since the central processing unit (Cpu) does not tnow the sending time of the acknowledgement signal init (Acu) nor the synchronization signal unit (Syu), he central processing unit (Cpu) is informed of the position where the acknowledgement signal unit (Acu) or the synchronization signal unit (Syu) is inserted in he sending signals. All telephone signals which have not yet been acknowledged by the distant station are cept in the central processing unit. Consequently, during the copying signal period c, if the processed sending signal is different from the acknowledgement signal init (Acu) and the synchronization signal unit (Syu), the processed sending signal is to be sent from the central processing unit and therefore the information meaning telephone signal is sent to Cpu. If the sending signal is the synchronization signal (Syu), the information meaning the synchronization signal unit is sent to Cpu, and if the sending signal is the acknowledgement signal unit (Acu), the information meaning the acknowledgement signal unit and block number of the sending and the receiving signal, are sent to (Cpu). As one signal unit comprises 20 bits, if the interface has a transmission capacity of 1 byte simultaneously, the sending time s, receiving time r and copying time c need transmission quantities of 3, 3 and 1 bytes, respectively.

Figure 5:
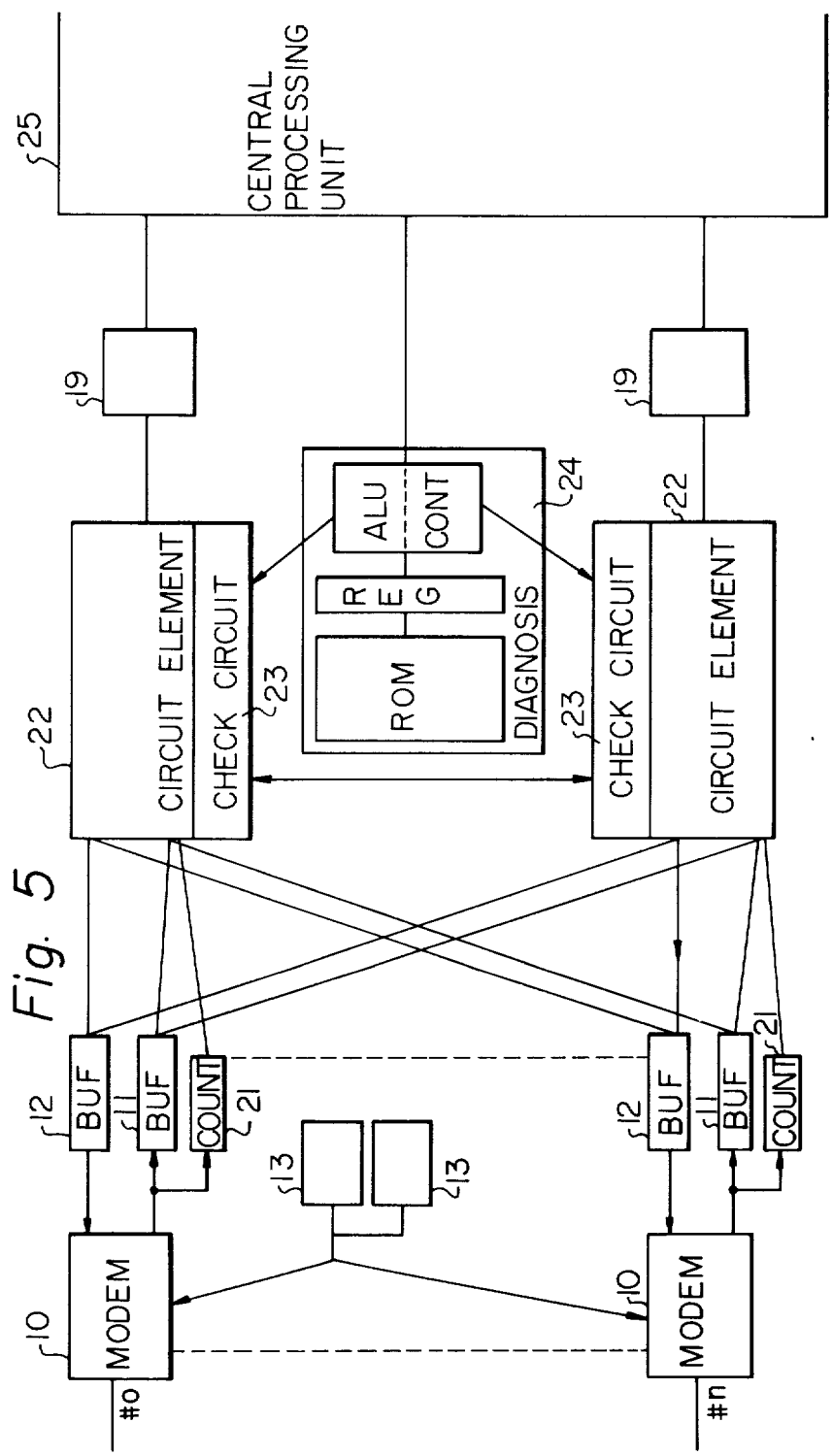
FIG. 5 is a block diagram showing another embodiment according to the present invention.

FIG. 5 shows another embodiment of the present invention. For the sake of convenience of explanation, circuit components having the identical function as the circuit components of the above-mentioned first example shown in FIG. 2 are represented by the same reference numerals, and explanations thereof are omitted.

Referring to FIG. 5, the embodiment is provided with a plurality of modulator-demodulator sets 10, a plurality of receiving signal buffer memories 11 and sending signal buffer memories 12, a pair of common clocks 13, a pair of interface circuits 19, a plurality of receiving signal unit counters 21, a pair of circuit elements 22. Elements 22 have the function of 14, 15, 16 and 17 of FIG. 2. Further, the embodiment is provided with a pair of comparing circuits 23 included in the circuit element 22, a diagnosis control circuit 24 and a central processing unit 25.

In this embodiment, the essential parts of the time division (or sharing) control such as 10, 11, 12, 19 and 22 mentioned in the foregoing embodiment of FIG. 2, are completely doubled so as to improve reliability. Consequently, only the increased function and elements due to the doubled components will be explained. Each of the doubled circuit elements 22 and the comparing circuits 23 are operated by the common clock 13 in a perfect synchronous condition and carry out synchronous processings. One of the doubled circuits is designated in operation and the other circuit is in standby. The circuit elements 22 independently carry out processing in each of the respective circuit systems, and the intermediate states of circuits 14 – 18 included in the respective circuit elements 22 are sent to the comparing circuits 23 at a suitable time, and the state of the corresponding circuits are compared with each other therein. In a normal state, the above-mentioned states of the respective circuits are the same, and the processing is continued. However, when the states do not agree with each other, the partner and also the central processing unit 25 are immediately so informed. After receiving this information, the central processing unit 25 stops sending the signal until the normal system is established. If the normal system is not established within one unit time, all the information received in this period is lost and the amount of lost signal units are counted by the receiving signal unit counter 21. When the normal system is established, a retransmission request based on the content of the abovementioned counter 21 is sent to the distant exchange at the sending time of the acknowledgement signal unit (Acu).

The device which discovered disagreement or the device informed of the discovery of disagreement carries out self-diagnosis operations under a suitable control of the diagnosis control circuit 24. The self-diagnosis is carried out, for example, by supplying the signal preliminarily set in the read-only-memory (ROM) in the diagnosis circuit 24 to the main parts of the circuit element 22 and observing the test result at several test points in the circuit element 22, or the output of the comparing circuit 23 and thus checking operation whether the system is normal or not is carried out.

The above checking operation is carried out by the arithmetic control circuit (ALU - CONT), which reads the diagnostic program from the read-only-memory to the register REG for said checking operation.

Further, when the self-diagnosis cannot be successful by the above method, the diagnosis operation is carried out by the central processing unit which is interrupted by the diagnosis control circuit 24 and sends the diagnosis data to the circuit 24 via the interface circuit 19 or directly. The above-mentioned diagnosis control circuit 24 may be merely an interface circuit which is similar to the interface 19. In this case, the diagnosis data are supplied from the central processing unit 25 via the circuit 24 to each device, and the result is again sent back to the central processing unit 25 via the diagnosis control circuit 24 so as to discriminate whether the pattern is normal or abnormal. After the normal system is discriminated, the terminal equipment of the normal system immediately begins processing, while the faulted terminal equipment is electrically cut off. And the common signal controller for controlling common channel signals operates single mode instead of dual mode. Further, the clocks 13 of the modulation-demodulation sets 10 are also doubled and in the case where one of them becomes out of order, the other one is instantly changed over.

As is apparent from the foregoing illustration and the sending signal and receiving signal processing time chart of FIG. 3, in the common signal controller according to the present invention, only the processing time required for the sending signal processing T should be strictly maintained. However, even when an inconsistency is detected during the receiving signal processing R, the troubled system may be electrically cut off during a period of approximately $t_2 - t_0 = t_4 - t_2$ without any undesirable effect on the processing result.

As already explained with reference to the above-mentioned embodiments according to the method of the present invention, the sending, receiving and synchronizing processings of the acknowledgement signal unit, and the sending processing of the synchronization signal unit and the process to neglect the receiving synchonization signal unit are all carried out by the common signal controller. Therefore, the load on the central processing unit may be considerably decreased and the call processing ability of the central processing unit may be considerably increased. Also, the clock oscillator of the modulation-demodulation sets is commonly used and, further, the check bit detection circuit and the check bit addition circuit are commonly used on the time division basis, which reduces and simplifies the configuration of the related hardware. Further, each processing cycle time is divided into a sending signal processing time which should be strictly punctual and a receiving signal processing time which may not be strictly punctual. The sending signal processing is carried out keeping a predetermined period of time, while the receiving signal processing is carried out only when the processing demand has arisen. Consequently, a considerable processing ability can be expected and the spare time for effectively carrying out synchronous dual mode operations in clock pulse base can be attained.

When the present invention is used in a common signal controller for such as No. 6 signalling system recommended by CCITT, a plurality of common channels can be controlled with a very high reliability. Further, if the present invention is applied to a general data communication control device, the device having the same high reliability as above with low cost can be obtained.

What is claimed is;

1. A stored program controlled electronic switching system for common channel signalling system through separate data links comprising:
    a. a common signal controller having at least a plurality of modulator-demodulator units each of which is connected to each data link, a plurality of pairs of first buffer memories each pair of which is connected to each modulator-demodulator unit for the conversion of the signal code on each data link from serial mode to parallel mode and from parallel mode to serial mode, means including a check bit detector and a check bit adder connected to said first buffer memories for the transmission error control, a second buffer memory connected between said means and an interface circuit, a clock generator commonly connected to said modulator-demodulator units for driving the same clock and sending signals in each data link in the same phase;
    b. said control of sending signal being in relatively high priority and said control of receiving signal being in relatively low priority;
    c. a stored program type computer connected to said interface for sending and receiving signals to and from said data links through said second buffer memory, processing the jobs including storing of the copy of the transmitted signals and re-transmitting it on request.

2. A control system as set forth in claim 1 and further comprising:
    a second one of said common signal controllers, said common signal controllers operating in a dual mode with each other on a synchronized basis;
    timing means for synchronization of said controllers;
    first and second comparison circuits respectively associated with said controllers, each being responsive to both of said controllers; and
    a diagnostic control circuit coupled to both of said controllers, said diagnostic circuit automatically sensing errors at each of said comparison circuits, and cutting off the controller associated with a comparison circuit at which an error is sensed.

3. In a stored program controlled electronic switching system for a common channel signalling system through separate data links comprising a common signal controller for processing on a time division basis the jobs including the conversion of the signal from serial mode to parallel mode and signal transmission control including transmission-error-control and, synchronization control for each data link, and a stored program-type computer connected to said common signal controller for processing the jobs including storing the copy of the transmitted signals and re-transmitting it on request, the improvement that said common signal controller comprises;
    a. a plurality of modulator-demodulator units each of which is connected to each data link;
    b. a clock generator connected commonly to said modulator-demodulator units for driving the same clock and sending a signal in each data link in the same phase;
    c. a plurality of pairs of first buffer memories each pair of which is connected to each modulator-demodulator unit for the conversion of the signal code on each data link from serial mode to parallel mode and from parallel mode to serial mode;
    d. means including a check bit detector and a check bit adder connected to said first buffer memories for the transmission error control;
    e. a second buffer memory connected to said means for sending and receiving the signal data between said stored program-type computer and said first buffer memories, and;
    f. an interface circuit connected between said second buffer memory and said stored program type computer.

* * * * *